(12) United States Patent
Yokota et al.

(10) Patent No.: US 6,581,757 B2
(45) Date of Patent: Jun. 24, 2003

(54) PRODUCT DIVERTING MECHANISM IN PACKAGING SYSTEM

(75) Inventors: Kazumasa Yokota, Kurita-gun (JP); Yuji Yokota, Kurita-gun (JP)

(73) Assignee: Ishida Co., Ltd., Kyoto (JP)

( * ) Notice: Subject to any disclaimer, the term of this patent is extended or adjusted under 35 U.S.C. 154(b) by 55 days.

(21) Appl. No.: 09/852,594

(22) Filed: May 9, 2001

(65) Prior Publication Data

US 2002/0043445 A1 Apr. 18, 2002

(30) Foreign Application Priority Data

Oct. 16, 2000 (JP) ....................................... 2000-315168

(51) Int. Cl.$^7$ .............................................. B65G 15/00
(52) U.S. Cl. ................................ 198/836.2; 198/370.1; 198/371.2
(58) Field of Search ............................... 198/890, 890.1, 198/367, 456, 370.02, 836.2, 370.1, 371.2, 436, 437

(56) References Cited

U.S. PATENT DOCUMENTS

| | | | |
|---|---|---|---|
| 3,782,527 A | | 1/1974 | Petershack |
| 4,703,844 A | | 11/1987 | Jahns |
| 5,191,959 A | * | 3/1993 | Leemkuil ..................... 198/365 |
| 5,529,167 A | * | 6/1996 | Gabriele ...................... 198/457 |
| 5,590,758 A | * | 1/1997 | Wilkins et al. ............. 198/890.1 |
| 5,730,579 A | * | 3/1998 | Keck et al. ................. 414/791.6 |
| 5,743,375 A | | 4/1998 | Shyr et al. |
| 6,068,105 A | * | 5/2000 | Darwish et al. ........... 198/370.02 |
| 6,139,240 A | * | 10/2000 | Ando ............................ 414/267 |
| 6,189,677 B1 | * | 2/2001 | Ruf et al. ..................... 198/411 |
| 6,253,905 B1 | * | 7/2001 | Pelka ............................ 198/456 |
| 6,419,073 B1 | * | 7/2002 | Piron ........................ 198/370.03 |

FOREIGN PATENT DOCUMENTS

| | | |
|---|---|---|
| DE | 3-604562 | 8/1987 |
| EP | 1-050464 | 1/2000 |
| GB | 1053712 | 1/1967 |

* cited by examiner

Primary Examiner—Christopher P. Ellis
Assistant Examiner—Rashmi Sharma
(74) Attorney, Agent, or Firm—Hogan & Hartson, LLP

(57) ABSTRACT

A product diverting mechanism used in a packaging system, which is effective to increase the speed at which the products are successively diverted, includes a force applicator for applying a force, including a force component acting in a horizontal direction, to the products transported from a preceding station, in a direction transverse to a direction of transport of the products, a suppressor disposed above a transporter for suppressing an upward shift of the products which occurs when the force applicator applies the force to the products, and an elevator for moving the suppressor up and down. The suppressor is lowered during an operation to divert the products so as to contact an upper surface of the products.

18 Claims, 6 Drawing Sheets

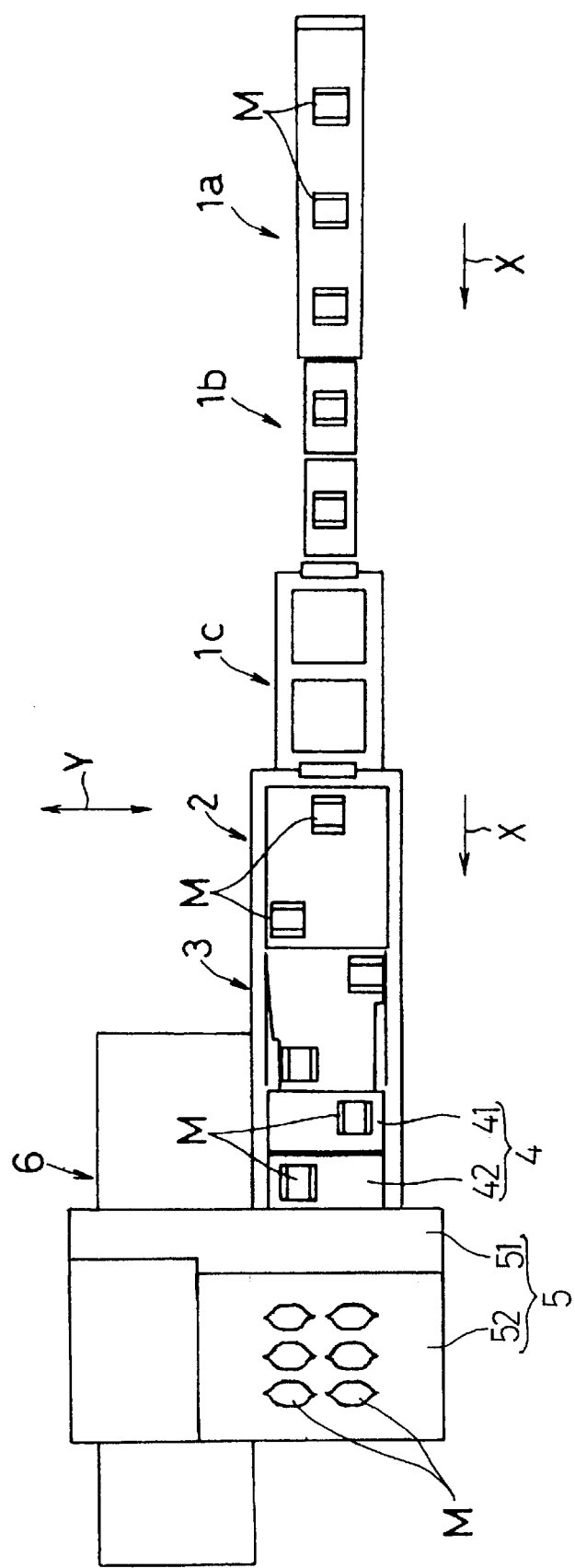

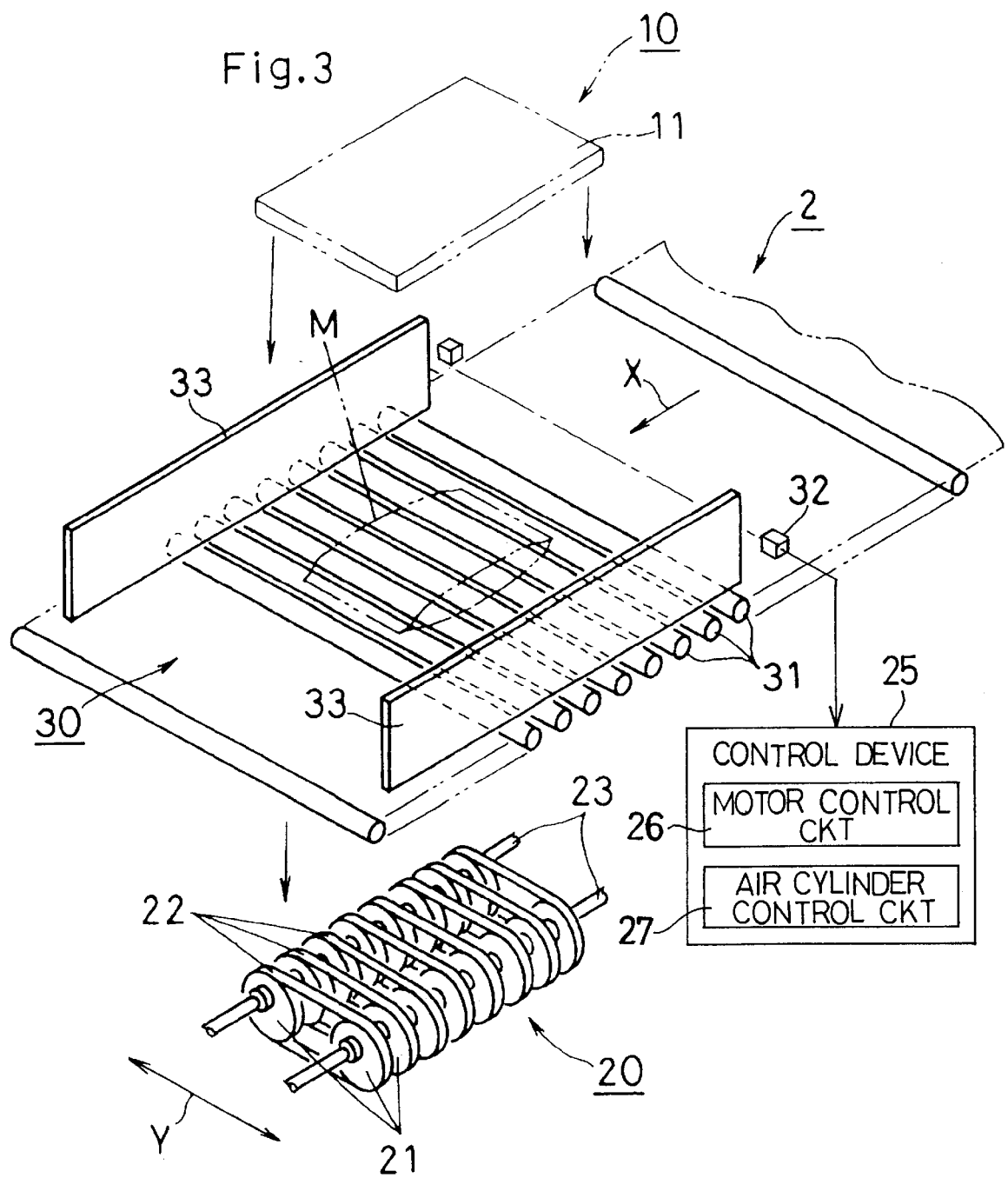

PRODUCT DIVERTING MECHANISM IN PACKAGING SYSTEM

BACKGROUND OF THE INVENTION

1. Field of the Invention

The present invention generally relates to a packaging system and, more particularly, to an improvement in and over a product diverting mechanism used in the packaging system.

2. Description of the Prior Art

Prior to shipment of products manufactured at a factory to wholesale stores and retail stores, it is a customary practice to package predetermined numbers of the products in corrugated cardboard boxes. While this packaging operation is often carried out by hand, various packaging systems that automate the packaging operation have also been suggested.

Such automatic packaging system is generally of a design in which a plurality of products that are lined up are sucked upwardly by, for example, a vacuum suction unit and are then stacked one above the other. In such case, where the products are arranged in a single row, suction and stacking are performed a considerable number of times. Accordingly, in order to reduce the cycle time per box, it can be contemplated to arrange the products in a plurality of rows and the products in those rows are sucked all at a time and then to stack them one above the other.

On the other hand, if the cycle time of the packaging operation is reduced as described above, the necessity will arise to increase the speed at which the products are diverted so as to form a plurality of rows of the products.

SUMMARY OF THE INVENTION

In view of the foregoing, a primary object of the present invention is to provide a product diverting mechanism for diverting the products so as to line up in a plurality of rows, which can contribute to increase of the speed at which the packaging operation is performed in the packaging system.

While the assignee of the present invention has filed an application for patent in Japan on an invention of a mechanism capable of increasing the diverting speed, another important object of the present invention is to provide the product diverting mechanism of the type referred to above which can perform a diverting operation assuredly and reliably even though the products to be diverted have a varying height.

In order to achieve these objects, the present invention in accordance with one aspect thereof provides a product diverting mechanism for diverting products on a transport means in a packaging system for packaging the products that have been transported from a preceding processing station. This product diverting mechanism includes a force applicator for applying a force, containing a force component acting in a horizontal direction, to the products being transported, in a direction transverse to a direction of transport of the products, a suppressor disposed above the transport means for suppressing an upward shift of the products which occurs when the force applicator applies the force to the products, an elevator for moving the suppressor up and down, and an elevation controller for controlling the elevator to lower the suppressor to thereby allow the suppressor to be brought into contact with an upper surface of each of the products during diverting of the products.

According to the present invention, since the force containing the horizontally acting force component is applied in a direction transverse to the direction of transport of the products, it is possible to divert the products leftwards and rightwards to form two rows of the products with respect to the direction of transport. Also, by adjusting the extent to which the products are diverted, not only can the two rows of the products be formed, but it is also possible to divert the products into three or more rows. Since in the present invention the products are diverted by the utilization of a mechanism of applying the force to the products in a direction transverse to the direction of transport of the products, the handling speed during the diverting operation can be decreased as compared with the prior art mechanism in which the products are retained by the suction holder which, after the products so sucked have been transported, is subsequently released from vacuum.

However, if the force containing the horizontally acting force component is applied by the force applicator in the direction transverse to the direction of transport, and where the applied force contains a vertically acting force component, there is a possibility that the product applied with such force will "float" above the transport path, resulting in difficulty to accomplish the diverting operation. In particular, where the diverting speed at which the diverting of the product is executed is increased, the product will float above the transport path by the action of the force applied by the force applicator to the product with the horizontally acting force component no longer acting on the product sufficiently and, therefore, there is a high possibility that the position of the products after having been diverted will not be constant.

In view of the foregoing, in the present invention, the use has been made of the suppressor to suppress an upward shift, that is, floatation, of the product above a predetermined level above the transport path. The use of the force applicator in combination with the suppressor is effective to allow the products to be securely diverted to predetermined positions.

If the type of the products is varied and/or the products have a varying thickness (height) as a result of variations from product to product, adjustment of the level of the suppressor to compensate for a change may be necessary. However, according to the aspect of the present invention, the suppressor is lowered during the diverting operation to contact an upper surface of the product. Accordingly, there is no need to perform adjustment of the level of the suppressor to accommodate change in thickness of the products. For this reason, not only can the workability of the system be increased, but the attendant worker need not perform a stage replacement.

In a preferred embodiment, the timing at which the suppressor is lowered by the elevator is preferably prior to or immediately after the product having been brought to a position immediately below the suppressor.

As a trigger for the timing at which the suppressor is lowered, a detector is preferably used "for detecting an entry of the product" to a position immediately below the suppressor. To detect the entry of the product this way is intended to mean that the detection may be performed at a position preceding the position at which the product is located below the suppressor, that is, at a position shortly before the entry, or at the time it is brought to the position below the suppressor, or at the moment it is brought to the position immediately below the suppressor.

Also preferably, the force applicator may include at least one pair of eccentric pulleys, each having an axis of rotation extending in a direction parallel to a direction of transport by the transport means, and a belt trained around and between the eccentric pulleys and adapted to travel in a direction perpendicular to the direction of transport, said belt having a portion that protrudes upwardly from a downwardly displaced position below a path of transport defined by the transport means, towards an upwardly displaced position above the path of transport during rotation of the eccentric pulleys to thereby shift the product upwardly. This design advantageously and conveniently makes it possible to simplify the structure of the force applicator.

The present invention in accordance with another aspect thereof provides a product diverting mechanism which includes a force applicator for applying a force, containing a force component acting in a horizontal direction, to the products being transported, in a direction transverse to a direction of transport of the products, and a suppressor disposed above the transport means for suppressing an upward shift of the products which occurs when the force applicator applies the force to the products. The suppressor used therein includes a movable plate supported by a frame for movement up and down between stand-by and lowered positions and also retractable upwardly when the product is brought to a position immediately beneath the suppressor with the movable plate contacting an upper surface of the product, and wherein when the movable plate is lowered with its undersurface contacting an upper surface of the product, the upward shift of the product is suppressed.

According to this aspect of the present invention, when the product is transported to a position beneath the diverting mechanism, the upper surface of the product is brought into contact with the movable plate, causing the movable plate to retract somewhat upwardly while the movable plate applies an urging force to the product. Accordingly, not only can any undesirable upward shift of the product be prevented, but no level adjustment of the suppressor is needed even though the height of the products varies somewhat. Also, although no elevator for elevating the suppressor is employed, additional advantage can be obtained in that the mechanism can be simplified, for example, there is no need to perform an extra electric control to drive the elevator.

If in this structure the weight of the movable plate is utilized to avoid the undesirable upward shift of the product, a meritorious effect can also be obtained in that the urging force acting on the products can be retained at a substantially constant value.

BRIEF DESCRIPTION OF THE DRAWINGS

In any event, the present invention will become more clearly understood from the following description of a preferred embodiment thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 2 is a schematic top plan view of the packaging system shown in FIG. 1;

FIG. 3 is an exploded view of a portion of the packaging system shown in FIG. 1;

DETAILED DESCRIPTION OF THE EMBODIMENT

Hereinafter, a preferred embodiment of the present invention will be described with reference to the accompanying drawings.

Figure 1:
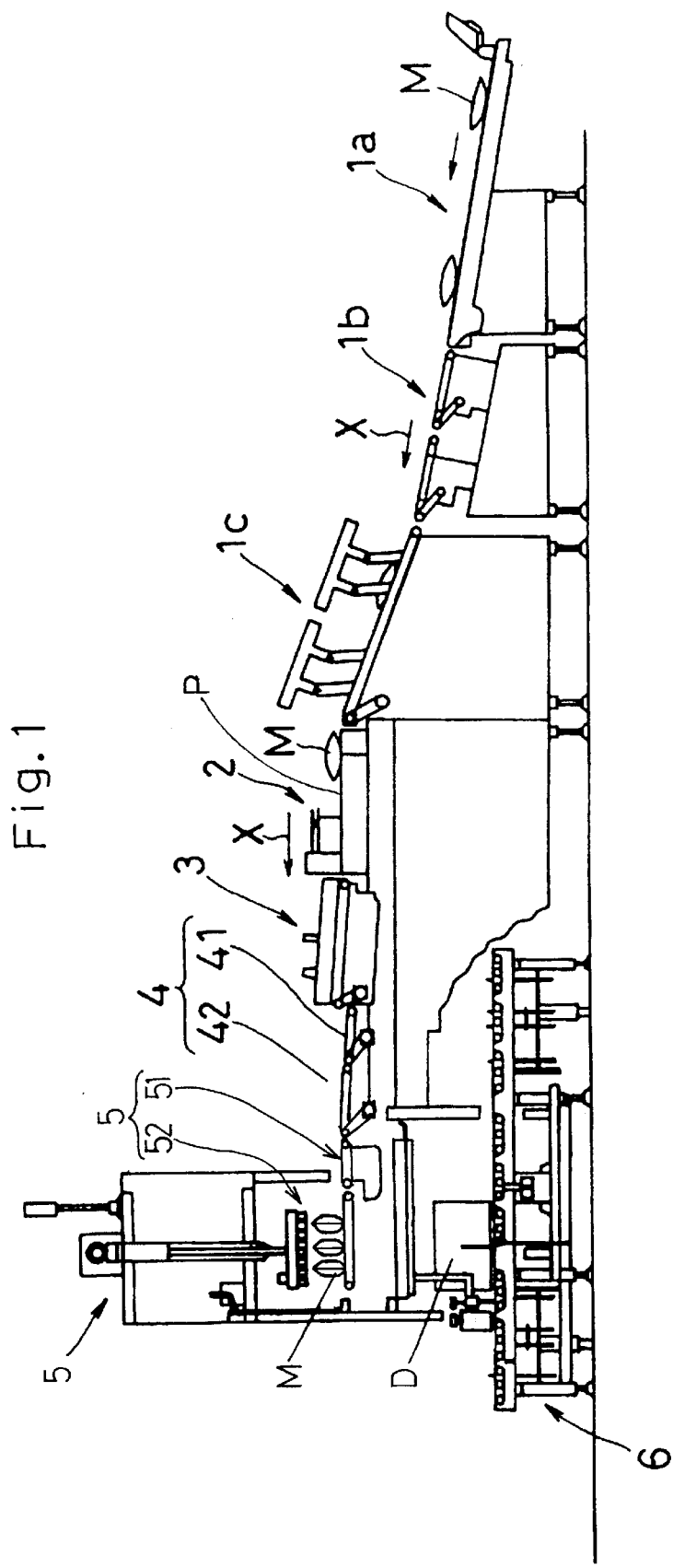
FIG. 1 is a schematic side view showing a packaging system embodying a preferred embodiment of the present invention.

System Overview:

The packaging system embodying the present invention in its entirety is schematically shown in FIGS. 1 and 2. The packaging system shown therein is so designed and so configured as to perform inspection of sealed bags (products) that are successively supplied to an inspecting station, one at a time to determine if the weight of each of the sealed bag meets a required weight and also to determine the presence or absence of a defective seal in each of the sealed bags inspected and as to successively package into a corrugated cardboard box only the sealed bags which have been deemed acceptable. The products to be packaged are those supplied from a preceding processing station where a weighing and bagging system is installed and each containing a predetermined weight of commodities such as, for example, fried potato chips filled and sealed in a respective film bag.

As shown in FIG. 1, the packaging system generally includes a transport unit 1a, a weight checking unit 1b, a seal checking unit 1c, a diverting unit (a product diverting mechanism) 2, an alignment unit 3, a transport rectifying unit 4, a packaging unit 5 and a box delivery unit 6 arranged in line in this order from an upstream side towards a downstream side with respect to the direction of flow of the bagged and sealed products M.

The bagged and sealed products M successively transported from the preceding processing stations in a horizontally laid position are first checked by the weight checking unit 1b to determine if each of the bagged and sealed products M meets a required weight. After the bagged and sealed products M have been checked as to their weight, the bagged and sealed products M are successively checked by pressing the products M from above by the seal checking unit 1c to determine if they have a defective seal. Some of the bagged and sealed products M which have been determined unacceptable either because of shortage of the weight or because of the presence of the defective seal are ejected out of the system by means of an ejecting machine not shown.

After the last check, i.e., the seal check, only the bagged and sealed products M that have been determined acceptable are successively transported in one row to the diverting unit 2, shown in FIG. 2, where they are alternately diverted in two lateral directions Y opposite to each other, which are orthogonal to the direction of transport X towards the packaging unit 5, so as to form two rows of the diverted products. The bagged and sealed products M so diverted by the diverting unit 2 into the two rows are subsequently turned 90° in a horizontal plane and are then transported towards the packaging unit 5 by means of a transport rectifying unit 4 including two transport conveyors 41 and 42 for adjusting transport timings and intervals between the bagged and sealed products M neighboring in the respective row. In the packaging unit 5 shown in FIG. 1, the bagged and sealed products M arranged in the two rows are simultaneously vacuum-sucked and placed into a corrugated cardboard box D then resting on the box delivery unit 6.

Details of Individual Machine Components

As shown in an exploded view in FIG. 3, the diverting unit 2 includes a transporter 30, a product detector 32, a pair of guide walls 33, a force applicator 20 and a suppressor 10. Of these machine components, the force applicator 20 and the suppressor 10 are utilized to divert the bagged and sealed products M into the two rows.

Transporter 30:

The transporter 30 includes a plurality of juxtaposed feed rollers 31 with their longitudinal axes oriented in a direction perpendicular to the direction of transport X. An upper surface region of those juxtaposed feed rollers 31 defines a transport path 35 for movement of the bagged and sealed products M. Specifically, the juxtaposed feed rollers 31 are operable to transport the products M placed thereon and are arranged so as to be spaced an equal distance from each other to define the transport path 35. Although not shown, these feed rollers 31 are driven about their own longitudinal axes by a drive motor. It is, however, to be noted that in FIG. 3, respective portions of the juxtaposed feed rollers 31 are shown by the phantom lines for the sake of brevity.

Force Applicator 20:

The force applicator 20 includes left and right reversible shafts 23 and 23 that are driven by a servo motor (not shown) in opposite directions to each other about their own longitudinal axes. These reversible shafts 23 and 23 extend in a direction conforming to the direction of transport X and have eccentric pulleys 21 mounted eccentrically thereon for rotation together therewith. Each of the eccentric pulleys 21 has a V-sectioned groove formed on its outer periphery. The eccentric pulleys 21 on one of the reversible shafts 23 and 23 are paired with the associated eccentric pulleys 21 on the other of the reversible shafts 23 and 23, and a V-belt 22 is trained around and between each pair of the eccentric pulleys 21 so as to extend in a direction perpendicular to the direction of transport X of the products M.

Figure 5A:
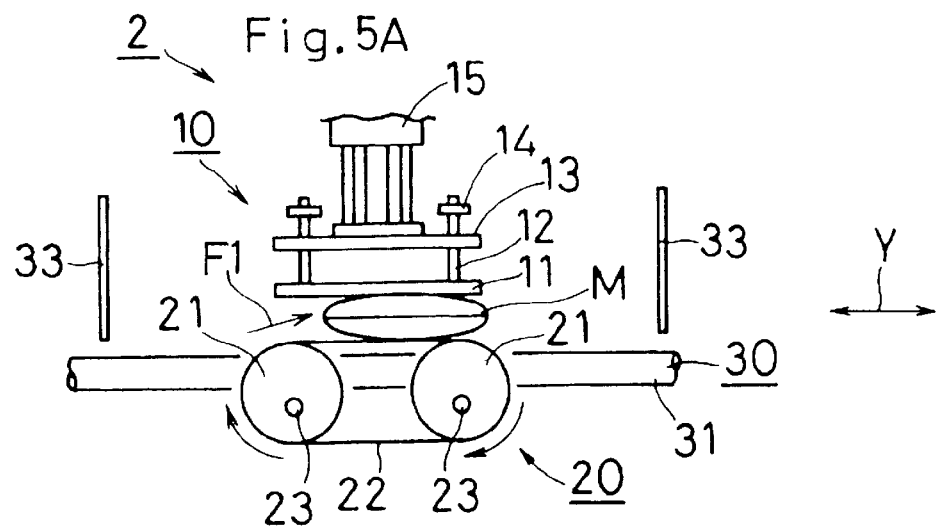
FIGS. 5A to 5C are schematic front elevational view, with a portion shown in section, of the diverting mechanism employed in the packaging system, showing the sequence of operation of the diverting mechanism.

As shown in FIG. 5A, the outer periphery of each of the eccentric pulleys 21 and the associated V-belt 22 can, during rotation of the shafts 23, alternately protrude upwardly and withdraw downwardly with respect to an upper level surface of the feed rollers 31 or the transport path 35. Accordingly, a force having a horizontal component acting in a horizontal direction Y perpendicular to the direction of transport X is applied to each of the products M being transported as the pulleys 21 protrude upwardly above the upper level surface of the feed rollers 31.

It is, however, to be noted that each pair of the eccentric pulleys 21 and the corresponding V-belt 22 trained therebetween are positioned between the neighboring feed rollers 31 and 31 so as to avoid an interference with the feed rollers 31 during upward protrusion of the outer peripheries of each pair of the eccentric pulleys 21 and the corresponding V-belt 22 from the upper level surface of the feed rollers 31. In other words, each pair of the eccentric pulleys 21 and the corresponding V-belt 22 trained therebetween shift up and down between stand-by and feed positions, as will be described later, through a space between the neighboring feed rollers 31 and 31.

Figure 4A:
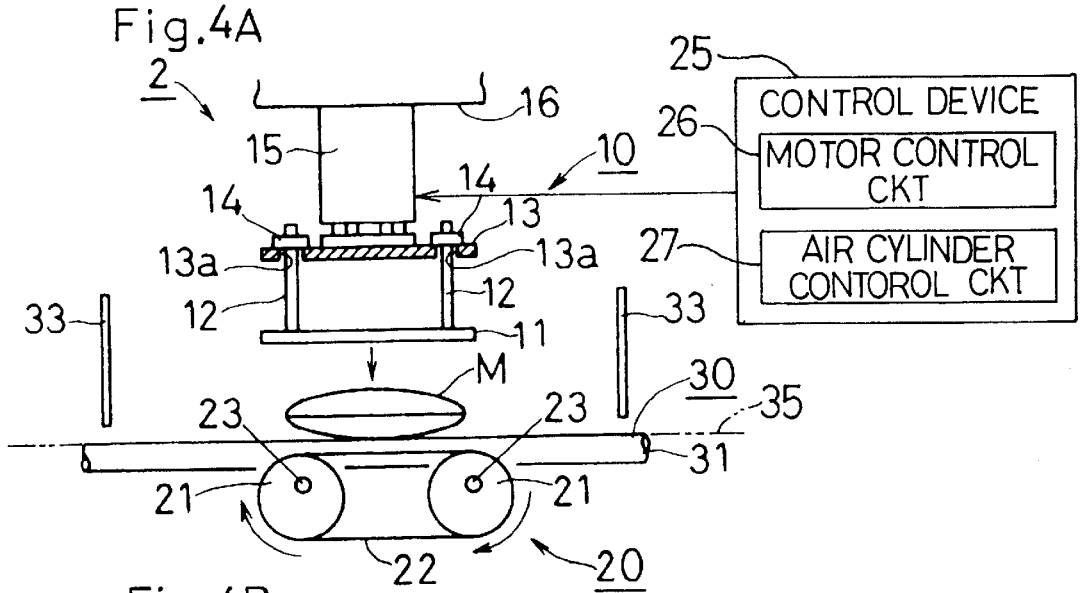
FIGS. 4A to 4C are schematic front elevational view, with a portion shown in section, of a diverting mechanism employed in the packaging system, showing the sequence of operation of the diverting mechanism.
Figure 4B:
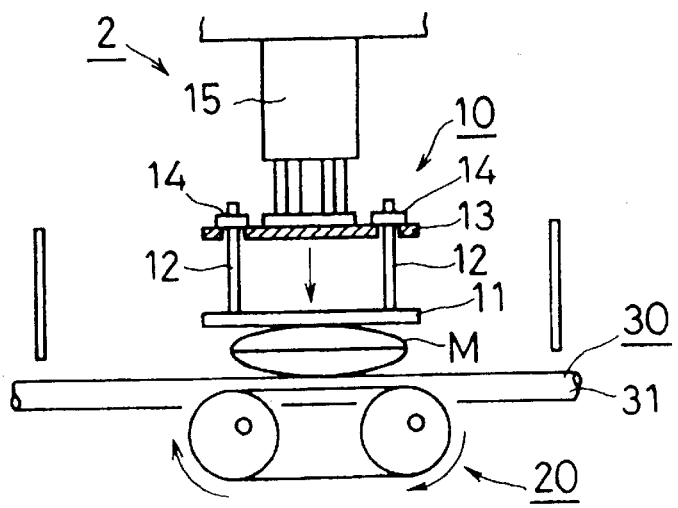

Suppressor 10:

As shown in FIG. 4A, the suppressor 10 includes, for example, a movable plate 11, a plurality of guide rods 12 and a support member 13 and a plurality of stoppers 14. The support member 13 is fixed to a lower end of an air cylinder (an elevator) 15 that is supported by an upper frame 16 of the diverting unit 2 and can be driven up and down by the air cylinder 15 in a direction perpendicular to the direction of transport X of the products M. This support member 13 has a plurality of throughholes 13a defined therein through which the respective guide rods 12 loosely extend, so that the guide rods 12 can move up and down freely relative to the support member 13. Respective upper ends of the guide rods 12 protruding upwardly from the support member 13 has the stoppers 14 fixed thereto, whereas opposite lower ends of the guide rods 12 are fixedly secured to the movable plate 11. Accordingly, the movable plate 11 is suspended from the support member 13 by means of the guide rods 12 and the stoppers 14 and, hence, from the air cylinder 15 for movement up and down relative to the upper frame 16. At the same time, the movable plate 11 is, since the guide rods 12 loosely extend through the associated throughholes 13a, supported for movement up and down freely relative to the support member 13 and, hence, to the upper frame 16. It is to be noted that if variation in thickness of the successively transported products M then lying flat against the feed rollers 31 is small, the suppressor 10 need not be driven up and down relative to the upper frame 16 and, therefore, the use of the air cylinder 15 can be dispensed with.

Product Detector 32 and Guide Walls 33

The product detector 32 shown in FIG. 3 is disposed upstream of the force applicator 20 with respect to the direction of transport X of the products M for detecting passage of each of the products M through the juxtaposed feed rollers 31. This product detector 32 is in the form of, for example, a photosensor assembly including a light projecting element and a light receiving element disposed on respective sides of the transport path for the products M and operable to supply to a control device 25 for controlling the diverting unit 2 an output signal indicative of passage of each of the products M across an optical path between the light projecting element and the light receiving element. The control device 25 includes a motor control circuit 26 for controlling each of the drive motors referred to previously and an air cylinder control circuit (an elevator controller) 27 for controlling the drive of the air cylinder 15 and operable in response to the product detection signal from the product detector 32 to initiate lowering of the suppressor 10 and rotation of the eccentric pulleys 21.

The guide walls 33 are in the form of a generally elongated plate extending in a direction conforming to the direction of transport X of the products M. The guide walls 33 are disposed on each side of the juxtaposed feed rollers 31 at respective locations above the juxtaposed feed rollers 31 in face-to-face relation with each other.

Operation of Product Diverting Mechanism 2

As hereinbefore described, the products M transported in a row from an upstream side of the packaging system shown in FIG. 1 are successively transferred from the seal checking unit Ic onto the juxtaposed feed rollers 31 of the diverting unit 2 shown in FIG. 3 and are then successively transported by and above the juxtaposed feed rollers 31. As shown in FIG. 4A the movable plate 11 is, before the products M are successively brought one at a time immediately below the movable plate 11, held at a stand-by position above the juxtaposed feed rollers 31.

When the product detector 32 (FIG. 3) detects passage of the product M across the optical path and then outputs a product detection signal to the control device 25, the air cylinder control circuit 27 of the control device 25 causes at a predetermined timing the air cylinder 15 to extend and the force applicator 20 to rotate.

Figure 4C:
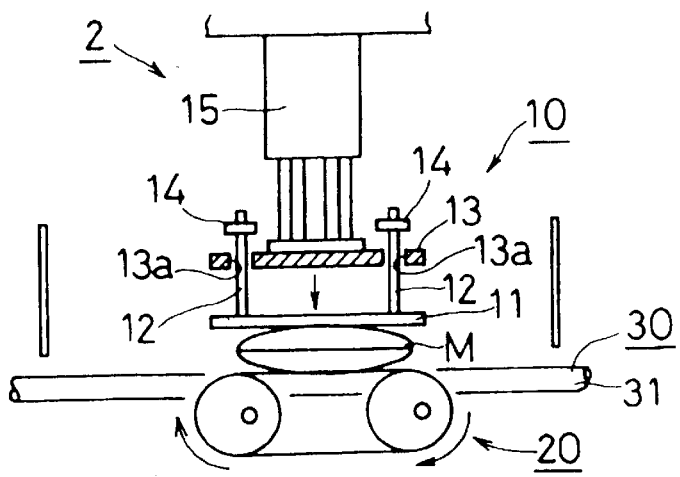

When the air cylinder 15 extends with the movable plate 11 consequently lowered and after the lowering movable plate 11 has therefore been brought into contact with an upper surface of the product M immediately therebelow, only the support member 13 is lowered as shown in FIG. 4C during continued extension of the air cylinder 15 while the movable plate 11 then contacting the upper surface of the product M is no longer lowered.

As shown in FIG. 5A, as a result of rotation of the eccentric pulleys 21 in one direction, for example, clockwise as shown therein, the outer peripheries of the eccentric pulleys 21 and the associated V-belts displace from the stand-by position beneath the transport path 35 that is defined by the upper level surfaces of the feed rollers 31, towards the feed potion where they protrude upwardly above the transport path 35. As the eccentric pulleys 21 and the V-belts so displace, the products M on the transport path 35 above the upper level surfaces of the feed rollers 31 are applied one at a time a vertically acting component of force acting in a direction perpendicular to the upper level surfaces of the feed rollers 31 and are therefore shifted upwardly one at a time. However, considering that the V-belts 22 are being driven around and between the pairs of the eccentric pulleys 21, each product M is also applied a horizontally acting component Y of force acting in a direction conforming to the direction of travel of the V belts 22 and is therefore forced to move sideways in a direction perpendicular to the direction of transport X. Consequently, during the upward shift of the outer peripheries of the eccentric pulleys 21 and the associated V-belts 22, each of the products M being transported is applied a diagonally upwardly acting diverting force F1 which is a composite force made up of the vertically acting force component and the horizontally acting force component Y as shown by the arrow F in FIG. 5A and is therefore, forced to displace diagonally upwardly as shown therein. On the other hand, the movable plate 11 applies its own weight to the product M to urge the latter downwardly against the V-belts 22 to thereby suppress an excessive upward shift of the product M being so moved diagonally upwardly.

Figure 5B:
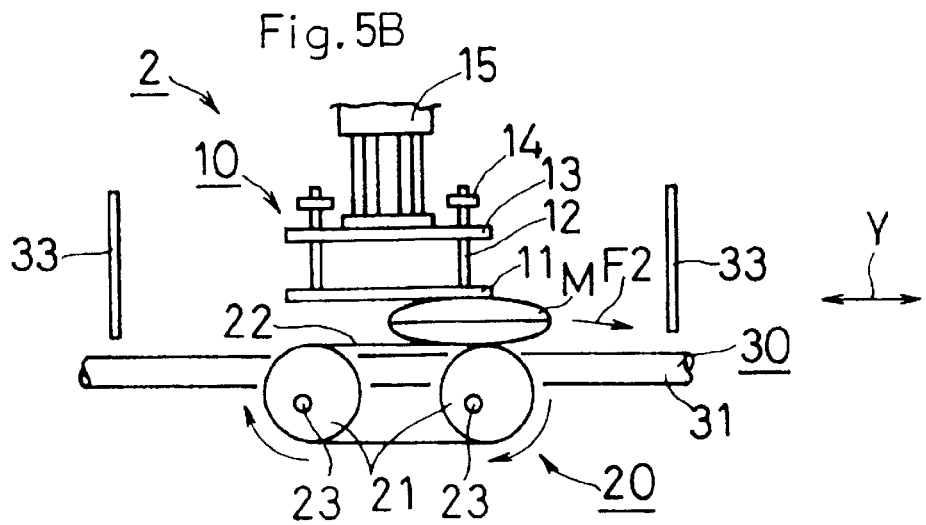

Thereafter, during continued rotation of the eccentric pulleys 21 in the clockwise direction, a diagonally downwardly acting diverting force F2, which is a composite force made up of a downwardly acting force component, brought about by the weight of the movable plate 11, and the horizontally acting force component Y acting in a rightward direction, acts on the respective product M as shown in FIG. 5B so that the product M can be moved sideways, i.e., rightwards in FIG. 5B, with respect to the direction of transport X.

Figure 5C:
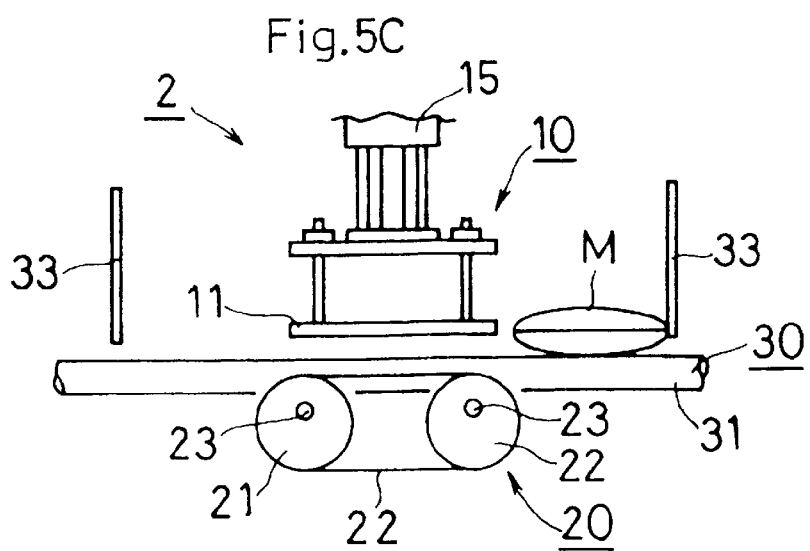

As shown in FIG. 5C, the respective product M so moved sideways is subsequently brought into contact with one of the guide walls 33 that is positioned on a right-hand side of the transport path 35 as viewed in FIG. 5C, thereby assuming a rightwardly diverted position and is then transported in a downstream direction by the feed rollers 31. After the product M has been diverted to the rightwardly diverted position in the manner described above, the movable plate 11 is shifted upwardly towards the stand-by position as shown in FIG. 4A and is then held thereat for the time to come. Thereafter, the control device 25 causes the shafts 23 and 23 to rotate in a counterclockwise direction that is reverse to the direction assumed during the previous cycle of diverting operation described above to start a subsequent cycle of diverting operation in which the next succeeding product M is diverted leftwards to assume a leftwardly diverted position adjacent the other of the guide walls 33 and 33.

As described hereinabove, during each cycle of diverting operation, the product M resting on the V-belts is urged downwardly by the weight of the movable plate 11 and, therefore, even though any of the products M is of a light weight and/or a bottom surface is deformed to undulate downwardly, they can be assuredly and reliably diverted.

In particular, regardless of the thickness of the products, the movable plate 11 is effective to apply a predetermined force on each of the products in a direction downwardly thereof, making it possible to accomplish the diverting operation assuredly and reliably.

The movable plate 11 is upwardly brought to the stand-by position each time the products M are diverted sideways and, accordingly, the height of the movable plate 11 need not be adjusted according to the thickness of the products M. Also, there is no possibility that the products M may collide against the movable plate 11 at the time the products M are successively transported to a diverting station where they are alternately diverted. For these reasons, the system as a whole can have an increased workability.

The products M so successively diverted into two rows in the manner described above are subsequently transported to a packaging station, shown in FIG. 1, where they are packaged into a corrugated cardboard box D by the packaging unit 5 positioned downstream of the diverting unit 2.

Packaging Unit 5:

As a conventional package unit, there exists a packaging unit of a design wherein the products M are, after having been successively erected to assume an upright position, vacuum-sucked and transferred into the corrugated cardboard box D. This packaging unit will now be described.

The packaging unit 5 includes an erecting section 51 on an upstream side and a suction transfer section 52 on a downstream side. The erecting section 51 may be of any known structure such as disclosed in, for example, the Japanese Laid-open Patent Publication No. 9-99904 published Apr. 15, 1997 and U.S. Pat. No. 5,884,749 and is operable to erect each of the products M transported from the transport rectifying unit 4 in a horizontally laid position to assume an upright position.

Figure 6A:
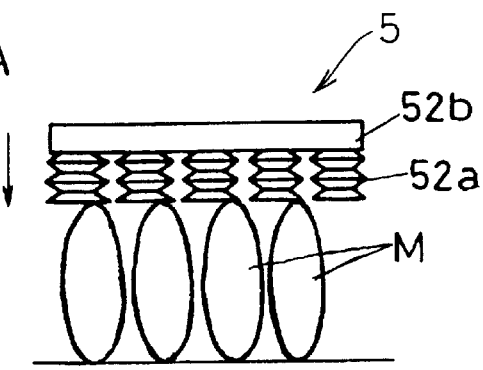
FIGS. 6A to 6E are schematic front views, showing the sequence of operation of the packaging unit forming a part of the packaging system.

As shown in FIG. 6A, the suction transfer section 52 of the packaging unit 5 includes a vacuum shroud 52b positioned above the product M and movable in a direction close towards and away from the product M and also in leftward and rightward directions and a plurality of suction bellows 52a secured to an undersurface of the vacuum shroud 52b so as to extend downwardly therefrom. A vacuum pump (not shown) is positioned above the vacuum shroud 52b and is communicated with the suction bellows 52a through the vacuum shroud 52b so that at a predetermined timing the interiors of the suction bellows 52a can be evacuated.

The suction transfer of the products M performed by the packaging unit 5 will now be described.

Figure 6B:
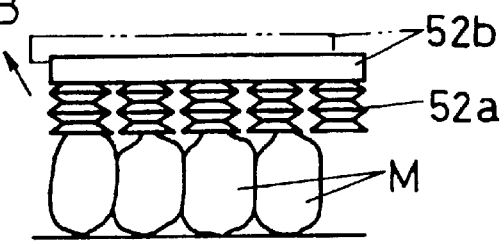
Figure 6C:
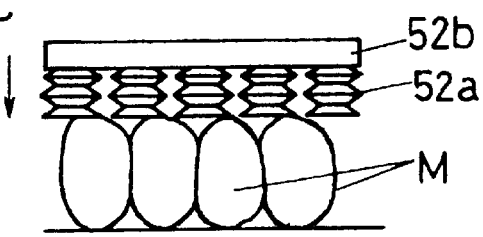

Referring to FIG. 6A, as the plural products M are transported in the upright posture to a position immediately below the suction bellows 52a, the vacuum shroud 52b is lowered vertically to cause the suction bellows 52a to suck the products M as shown in FIG. 6B. After the products M have been sucked by the suction bellows 52a, the vacuum shroud 52b is diagonally upwardly in the rightward direction moved with the sucked products consequently pulled a slight distance upwardly as shown in FIG. 6C.

Figure 6D:
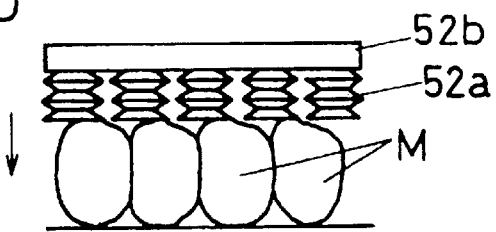
Figure 6E:
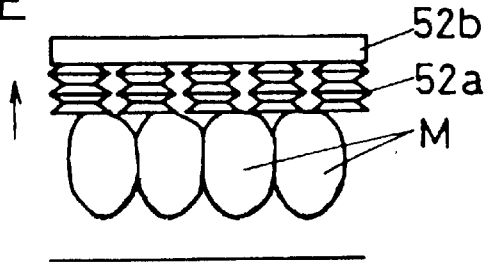

After the products M have thus been pulled upwardly, the vacuum shroud 52b is again lowered vertically to urge the products M downwardly as shown in FIG. 6D so that the products M can adapt themselves to the suction bellows 52a. Thereafter, as shown in FIG. 6E, the vacuum shroud 52b is moved vertically upwardly to lift the products M, followed by transfer of the products M into the corrugated cardboard box D.

As hereinabove described, since the suction bellows 52a once sucked the products M and then shifted upwardly together with the products M are again lowered to allow the products M to adapt themselves to the suction bellows 52a, some of the products M that could not be properly sucked by the corresponding suction bellows 52a during the initial suction can be sucked by the suction bellows 52a during the subsequent suction and, therefore, the plural products M can be sucked by the suction bellows 52a assuredly and reliably.

It is to be noted that the operation to adapt the plural products M to the suction bellows 52a may be sufficient if the suction bellows 52a are moved at least either leftwards or rightwards, may be performed in a plurality of times and/or the suction bellows 52 may be moved leftwards and rightwards while being lowered.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, the timing at which the suppressor 10 shown in FIG. 4A is lowered may be varied depending on the products M. Also, the level of the stand-by position for the movable plate 11 and the stroke of movement thereof may also be varied depending on the products M. In addition, in place of the air cylinder 15, any other drive means such as an electric drive motor can be employed.

Although it has been described that the movable plate 11 when lowered is held in contact with the products M, the movable plate 11 need not be held in contact therewith and may contact the products M when the V-belts 22 are brought above the upper surface level of the transport means 30.

The downwardly acting force applied by the movable plate 11 to the products during the diverting operation may not be always limited to that brought about by the weight of the movable plate 11, but may be the one generated by a spring element or a servo motor.

With respect to the horizontally acting force to be applied to the products M, the use may be made of a drive device such as belts in association with the movable plate 11 so that a horizontally acting force can be applied to an upper surface of the respective product M.

Yet, by performing alternately a diverting operation to divert the products M leftwards and rightwards and a non-diverting operation in which the products M are not diverted in any way, the products may be arranged into three rows, i.e., left, right and intermediate rows.

Accordingly, such changes and modifications are, unless they depart from the scope of the present invention as delivered from the claims annexed hereto, to be construed as included therein.

What is claimed is:

1. A product diverting mechanism for diverting products on a transporter in a packaging system for packaging the products that have been transported from a preceding processing station, said product diverting mechanism comprising:
   a force applicator for applying a force, the force including a force component acting in a horizontal direction, to the products being transported, in a direction transverse to a direction of transport of the products;
   a suppressor disposed above the transport means for suppressing an upward shift of the products which occurs when the force applicator applies the force to the products;
   an elevator for moving the suppressor up and down; and
   an elevation controller for controlling the elevator to lower the suppressor to thereby allow the suppressor to be brought into contact with an upper surface of each of the products during diverting of the products.

2. The product diverting mechanism in the packaging system as claimed in claim 1, wherein the elevator controller causes the suppressor to be shifted upwardly to a stand-by position before the product is transported to a position immediately below the suppressor, but to be lowered after the product has been transported to the position immediately below the suppressor.

3. The product diverting mechanism in the packaging system as claimed in claim 1, further comprising a detector for detecting passage of the product towards a position immediately below the suppressor and wherein the elevator is lowered at a predetermined timing subsequent to detection of the product by the detector.

4. The product diverting mechanism in the packaging system as claimed in claim 1, wherein the suppressor comprises a movable plate supported by a frame for movement up and down between stand-by and lowered positions and also retractable upwardly relative to the frame when the product is brought to a position immediately beneath the suppressor with the movable plate contacting an upper surface of the product, and wherein when the movable plate is lowered with its undersurface contacting an upper surface of the product, the upward shift of the product is suppressed.

5. The product diverting mechanism in the packaging system as claimed in claim 4, wherein the suppressor comprises a support member disposed at a location confronting the movable plate, a plurality of guide rods extending through the support member and a stopper fixedly mounted on an upper end of each of the guide rods and held in abutment with an upper surface of the support member, and wherein the movable plate is fitted to lower ends of the respective guide rods.

6. The product diverting mechanism in the packaging system as claimed in claim 4, wherein the upward shift of the product is prevented by a weight of the movable plate.

7. The product diverting mechanism in the packaging system as claimed in claim 1, wherein the force applicator comprises at least one pair of eccentric pulleys, each having an axis of rotation extending in a direction parallel to a direction of transport by the transport means, and a belt trained around and between the eccentric pulleys and adapted to travel in a direction perpendicular to the direction of transport, said belt having a portion that protrudes upwardly from a downwardly displaced position below a path of transport defined by the transport means, towards an upwardly displaced position above the path of transport during rotation of the eccentric pulleys to thereby shift the product upwardly.

8. A product diverting mechanism, for diverting products on a transporter in a packaging system for packaging the products that have been transported from a preceding processing station, said product diverting mechanism comprising:
   a force applicator for applying a force, the force including a force component acting in a horizontal direction, to the products being transported, in a direction transverse to a direction of transport of the products; and
   a suppressor disposed above the transport means for suppressing an upward shift of the products which occurs when the force applicator applies the force to the products;
   said suppressor comprising a movable plate supported by a frame for movement up and down between stand-by and lowered positions and also retractable upwardly when the product is brought to a position immediately beneath the suppressor with the movable plate contacting an upper surface of the product, and wherein when the movable plate is lowered with its undersurface contacting an upper surface of the product, the upward shift of the product is suppressed.

9. The product diverting mechanism in the packaging system as claimed in claim 8, the suppressor comprises a support member disposed at a location confronting the movable plate, a plurality of guide rods extending through the support member and a stopper fixedly mounted on an upper end of each of the guide rods and held in abutment with an upper surface of the support member, and wherein the movable plate is fitted to lower ends of the respective guide rods.

10. The product diverting mechanism in the packaging system as claimed in claim 8, wherein the upward shift of the product is prevented by a weight of the movable plate.

11. The product diverting mechanism in the packaging system as claimed in claim 8, wherein the force applicator comprises at least one pair of eccentric pulleys, each having an axis of rotation extending in a direction parallel to a direction of transport by the transport means, and a belt trained around and between the eccentric pulleys and adapted to travel in a direction perpendicular to the direction of transport, said belt having a portion that protrudes upwardly from a downwardly displaced position below a path of transport defined by the transport means, towards an upwardly displaced position above the path of transport during rotation of the eccentric pulleys to thereby shift the product upwardly.

12. A product diverting mechanism for diverting products on a transporter in a packaging system for packaging the products that have been transported from a preceding processing station, said product diverting mechanism comprising:
a force applicator for applying a force, the force including a force component acting in a horizontal direction, to the products being transported, in a direction transverse to a direction of transport of the products;
a suppressor disposed above the transport means for suppressing an upward shift of the products which occurs when the force applicator applies the force to the products;
an elevator for moving the suppressor up and down; and
an elevation controller for controlling the elevator to lower the suppressor to thereby allow the suppressor to be brought into contact with an upper surface of each of the products during diverting of the products, wherein the elevation controller is operable to control the elevator to shift the suppressor upwardly to a stand-by position in which the suppressor is not in contact with the products.

13. The product diverting mechanism in the packaging system as claimed in claim 12, wherein the elevator controller causes the suppressor to be shifted upwardly to a stand-by position before the product is transported to a position immediately below the suppressor, but to be lowered after the product has been transported to the position immediately below the suppressor.

14. The product diverting mechanism in the packaging system as claimed in claim 12, further comprising a detector for detecting passage of the product towards a position immediately below the suppressor and wherein the elevator is lowered at a predetermined timing subsequent to detection of the product by the detector.

15. The product diverting mechanism in the packaging system as claimed in claim 12, wherein the suppressor comprises a movable plate supported by a frame for movement up and down between stand-by and lowered positions and also retractable upwardly relative to the frame when the product is brought to a position immediately beneath the suppressor with the movable plate contacting an upper surface of the product, and wherein when the movable plate is lowered with its undersurface contacting an upper surface of the product, the upward shift of the product is suppressed.

16. The product diverting mechanism in the packaging system as claimed in claim 15, wherein the suppressor comprises a support member disposed at a location confronting the movable plate, a plurality of guide rods extending through the support member and a stopper fixedly mounted on an upper end of each of the guide rods and held in abutment with an upper surface of the support member, and wherein the movable plate is fitted to lower ends of the respective guide rods.

17. The product diverting mechanism in the packaging system as claimed in claim 15, wherein the upward shift of the product is prevented by a weight of the movable plate.

18. The product diverting mechanism in the packaging system as claimed in claim 12, wherein the force applicator comprises at least one pair of eccentric pulleys, each having an axis of rotation extending in a direction parallel to a direction of transport by the transport means, and a belt trained around and between the eccentric pulleys and adapted to travel in a direction perpendicular to the direction of transport, said belt having a portion that protrudes upwardly from a downwardly displaced position below a path of transport defined by the transport means, towards an upwardly displaced position above the path of transport during rotation of the eccentric pulleys to thereby shift the product upwardly.

* * * * *